(12) United States Patent
Isami et al.

(10) Patent No.: US 11,906,040 B2
(45) Date of Patent: Feb. 20, 2024

(54) SHIFTING DEVICE FOR VEHICLE

(71) Applicant: TOYOTA JIDOSHA KABUSHIKI KAISHA, Toyota (JP)

(72) Inventors: Yoichiro Isami, Mishima (JP); Hiroyuki Amano, Susono (JP); Takayuki Oshima, Susono (JP); Makoto Takano, Sunto-gun (JP); Yuta Tsukada, Sunto-gun (JP); Kiyosuke Hayamizu, Susono (JP); Hiroaki Kodera, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/819,737

(22) Filed: Aug. 15, 2022

(65) Prior Publication Data

US 2023/0072063 A1 Mar. 9, 2023

(30) Foreign Application Priority Data

Sep. 7, 2021 (JP) ................. 2021-145215

(51) Int. Cl.
*F16H 59/10* (2006.01)
*F16H 59/04* (2006.01)
*F16H 61/18* (2006.01)
*F16H 61/24* (2006.01)
*F16H 59/08* (2006.01)

(52) U.S. Cl.
CPC ......... *F16H 59/105* (2013.01); *F16H 59/044* (2013.01); *F16H 61/18* (2013.01); *F16H 61/24* (2013.01); *F16H 2059/082* (2013.01); *F16H 2061/242* (2013.01)

(58) Field of Classification Search
CPC .. F16H 59/0204; F16H 59/044; F16H 59/105; F16H 2059/082; F16H 61/18; F16H 61/24; F16H 2061/242
See application file for complete search history.

(56) References Cited

U.S. PATENT DOCUMENTS

| 9,383,000 | B2 * | 7/2016 | Tippelhofer | ........... B60Q 3/283 |
| 11,068,015 | B2 * | 7/2021 | Ofenloch | ................ F16H 61/24 |
| 2003/0188594 | A1 | 10/2003 | Levin et al. | |
| 2012/0085193 | A1 | 4/2012 | Heo et al. | |
| 2015/0345636 | A1 | 12/2015 | Thorausch | |

(Continued)

FOREIGN PATENT DOCUMENTS

| DE | 10 2010 049 758 A1 | 5/2012 |
| JP | 10-67249 A | 3/1998 |
| JP | H11-311332 A | 11/1999 |

(Continued)

*Primary Examiner* — Joseph Brown
(74) *Attorney, Agent, or Firm* — Oblon, McClelland, Maier & Neustadt, L.L.P.

(57) ABSTRACT

A shifting device in which a selected shift position can be confirmed easily, and which can be fitted easily in vehicles. The shifting device comprises: a restriction member that restricts a movement of a shift lever into a predetermined shift slot in a first shifting mode, and that cancels the restriction of the movement of the shift lever in a second shifting mode; and an indicator that indicates a first pattern when the first shifting mode is selected, and that indicates a second pattern when the second shifting mode is selected.

8 Claims, 4 Drawing Sheets

(56) References Cited

U.S. PATENT DOCUMENTS

2017/0335948 A1 11/2017 Schulze
2021/0229550 A1 7/2021 Isami

FOREIGN PATENT DOCUMENTS

| JP | 2008-6957 A | 1/2008 |
| JP | 2008-6958 A | 1/2008 |
| JP | 2010-013102 A | 1/2010 |
| JP | 6787507 B1 | 11/2020 |

* cited by examiner

SHIFTING DEVICE FOR VEHICLE

CROSS-REFERENCE TO RELATED APPLICATIONS

The present disclosure claims the benefit of Japanese Patent Application No. 2021-145215 filed on Sep. 7, 2021 with the Japanese Patent Office.

BACKGROUND

Field of the Disclosure

Embodiments of the present disclosure relate to the art of a shifting device for vehicles which may be used commonly in different shifting mode.

Discussion of the Related Art

JP-A-H10-67249 describes a shift operation device of automatic transmission that is operated not only in an automatic shift mode in which a speed ratio is changed automatically depending on a running condition of a vehicle, but also in a manual shift mode in which a speed ratio is changed manually by operating the shift operation device. In the shift operation device taught by JP-A-H10-67249, a range shift slot in which a shift lever is moved in the automatic shift mode and a gear shift slot in which the shift lever is moved in the manual shift mode are formed parallel to each other, and the range shift slot and the gear shift slot are connected to each other through a transverse connection slot. Specifically, in the automatic shift mode, the shift lever is moved in the slot to select a drive range from a drive range (D), a reverse range (R), and so on, and a shifting operation is caused automatically depending on a running condition of the vehicle. The shift mode is shifted from the automatic shift mode to the manual shift mode by moving the shift lever from the range shift slot to the gear shift slot via the connection slot. In the manual shift mode, an upshifting of the gear stage is caused by moving the shift lever to an upshifting position, and a downshifting is caused by moving the shift lever to a downshifting position. That is, in the manual shift mode, the gear stage is selected manually by the driver.

JP-A-2008-6957 describes a shift lever device which can be used commonly in a right-hand vehicle and a left-hand vehicle. In the right-hand vehicle and the left-hand vehicle, the shift lever is operated in opposite directions to change gear. According to the teachings of JP-A-2008-6957, therefore, a manual switch and a frame body having a switch engaging part are designed to be reversed so that shift lever device may be fit not only in the right-hand vehicle but also in the left-hand vehicle without altering parts. For this reason, the number of parts of the shift lever device may be reduced.

JP-A-2008-6958 describes a shift lever device in which a shift lever is tilted to right or left to shift a shift mode between an automatic mode and a manual mode. In the shift lever device taught by JP-A-2008-6958, an operating range or a gear stage is shifted by moving the shift lever back and forth while tilting right or left. To this end, in the shift lever device taught by JP-A-2008-6958, a slot in which the shift lever is moved to shift the operating range and a slot in which the shift lever is moved to shift the gear stage are also formed parallel to each other.

JP-B1-6787507 describes an electric vehicle having a shift device. The electric vehicle taught by JP-B1-6787507 is not provided with a transmission and a clutch, and powered only by a motor. According to the teachings of JP-B1-6787507, an operating mode of the electric vehicle may be selected from an electric vehicle mode and a virtual manual mode. In the electric vehicle mode, an operating range of the electric vehicle is selected by operating the shift device. Whereas, in the virtual manual mode, a change in torque in a conventional vehicle having a manual transmission during manual shifting may be imitated by manipulating the shift device. According to the teachings of JP-B1-6787507, specifically, a virtual gear stage may be shifted among a plurality of stages by manipulating the shift device.

As described, in the shift operation device taught by JP-A-H10-67249, the range shift slot and the gear shift slot are formed parallel to each other, and the operating range and the gear stage are selected by manipulating the shift lever in the slots. A selected operating range or gear stage may be confirmed visually by a driver. In the shift operation device taught by JP-A-H10-67249, however, only the upshifting position and the downshifting position are available in the gear shift slot. Therefore, the gear stage may not be shifted to a stage at least two stages lower or higher than the current stage.

In addition, in the shift operation device taught by JP-A-H10-67249, the range shift slot and the gear shift slot are formed parallel to each other. Therefore, the shift operation device taught by JP-A-H10-67249 has to be downsized to conserve space. For example, in the electric vehicle described in JP-B1-6787507, it is necessary to arrange six shift positions to imitate the behavior of the conventional vehicle having a manual transmission during manual shifting. In the electric vehicle of this kind, it is also necessary to arrange positions to select the operating range in the shifting device. Therefore, given that the range shift slot and the gear shift slot are formed in the shifting device of the electric vehicle of this kind as described in JP-A-H10-67249, a size of the shifting device has to be increased and a structure of the shifting device has to be complicated by the gear shift slot.

As also described, according to the teachings of JP-A-2008-6957, the parts of the shift lever device may be used commonly in the right-hand vehicles and the left-hand vehicles. However, although the parts of the shift lever device may be used commonly in the right-hand vehicles and the left-hand vehicles, a shift pattern may not be reversed in the right-hand vehicle and the left-hand vehicle. In other words, the shift lever device taught by JP-A-2008-6957 may not be applied to a vehicle in which a plurality of shift pattern are available.

In the shift lever device taught by JP-A-2008-6958, the two slots are also formed parallel to each other. Therefore, the shift lever device taught by JP-A-2008-6958 has the same technical problems as JP-A-H10-67249.

Thus, in the foregoing shifting devices configured to select the automatic shift mode and the manual shift mode, the range shift slot and the gear shift slot are formed. Therefore, in the foregoing shifting devices, a selected shift mode, a selected operating range, and a selected gear stage may be confirmed visually by confirming a position of the shift lever. However, since the two slots are required, sizes of the foregoing shifting devices are not compact enough, and hence it is preferable to downsize and simplify the foregoing shifting devices. In addition, it is preferable to improve visibility of the selected operating range and shift positions in the foregoing shifting devices.

SUMMARY

Aspects of embodiments of the present disclosure have been conceived noting the foregoing technical problems, and it is therefore an object of the present disclosure to provide a shifting device for vehicles in which a selected shift position can be confirmed easily, and which can be fitted easily in vehicles.

According to the exemplary embodiment of the present disclosure, there is provided a shifting device for a vehicle, comprising: a shift lever that is moved to a desired shift position; a plurality of shift slots that guide the shift lever to a plurality of the shift positions; and a selector slot that guides the shift lever from a base position to the shift slots. In order to control a driving force to propel the vehicle in different manners, a shifting mode of the shifting device may be selected from a first shifting mode and a second shifting mode. In order to achieve the above-explained objectives, according to the exemplary embodiment of the present disclosure, the shifting device is provided with: a restriction member that restricts a movement of the shift lever into a predetermined shift slot toward a predetermined shift position in the first shifting mode, and that cancels the restriction of the movement of the shift lever in the second shifting mode; and an indicator that indicates a first pattern when the first shifting mode is selected, and that indicates a second pattern when the second shifting mode is selected. The first pattern indicates a diagram indicating directions from the base position to the shift positions available in the first shifting mode in which the movement of the shift lever is restricted by the restriction member. Whereas, the second pattern indicates a diagram indicating the base position and the shift positions available in the second shifting mode in which the restriction of movement of the shift lever is cancelled.

In a non-limiting embodiment, the selector slot and the shift slots used in the first shifting mode to guide the shift lever may be congruent with a part of the selector slot and the shift slots used in the second shifting mode to guide the shift lever. In addition, the base position and the shift positions available in the first shifting mode correspond to the base position and predetermined shift positions in the second shifting mode.

In a non-limiting embodiment, the indicator may have a mode indicating function to indicate the shifting mode selected from the first shifting mode and the second shifting mode.

In a non-limiting embodiment, the mode indicating function may include: a function to indicate the selected shifting mode by letters; a function to change a color of a background of the indicated diagram depending on the selected shifting mode; and a function to change a pattern of the background depending on the selected shifting mode.

In a non-limiting embodiment, the indicator may have a function to highlight the shift position selected by operating the shift lever being indicated in the diagram.

In a non-limiting embodiment, the indicator may have a function to indicate the shift positions by letters, and the function to highlight the selected shift position may include a function to highlight the selected shift position by indicating the letters representing the selected position in different manners.

In a non-limiting embodiment, the shift positions available in the second shifting mode may include a plurality of forward positions, and the indicator may have a function to instruct a driver to shift the shift position in accordance with a change in a driving condition of the vehicle.

In a non-limiting embodiment, the function to instruct the driver to shift the shift position may include: a function to indicate a predetermined instruction message; a function to change a color of a background of the indicated diagram; a function to change a pattern of the background; and a function to blink an indication of a recommended shift position to be selected.

In a non-limiting embodiment, an operating mode of the vehicle may be selectable in the second shifting mode from a first operating mode in which an upshifting is caused at a predetermined speed of the vehicle, and a second operating mode in which the upshifting is caused at a higher speed of the vehicle than the predetermined speed. In addition, the indicator may have a function to change a timing to blink the indication of the recommended shift position to be selected.

Thus, in the shifting device according to the exemplary embodiment of the present disclosure, the shift lever is guided by the selector slot and the shift slot from the base position to the desired shift position. In the first shifting mode, a movable range of the shift lever within the selector slot and the shift slots is restricted by the restriction member. Whereas in the second shifting mode, the restriction of the movable range of the shift lever is cancelled so that the shift lever is allowed to move to any of available shift positions in the second mode. That is, the selector slot and the shift slots used in the first shifting mode are congruent with a part of the selector slot and the shift slots used in the second shifting mode. According to the exemplary embodiment of the present disclosure, therefore, the shifting mode may be selected from at least two modes. In addition, an operating range in the first shifting mode and a gear stage in the second shifting mode may be changed by operating the common shift lever. For this reason, the shifting device may be downsized to be fitted easily in vehicles.

In the shifting device according to the exemplary embodiment of the present disclosure, the driver is not allowed to visibly confirm configurations of the selector slot and the shift slots used in the first shifting mode, and the selector slot and the shift slots used in the second shifting mode. However, the diagrams indication shift patterns in the first shifting mode and the second shifting mode are indicated by the indicator mounted on the shift lever. According to the exemplary embodiment of the present disclosure, therefore, the selected operating mode and the selected shift position may be confirmed visibly.

In addition, the selected shifting mode may also be indicated by letter on the indicator so that the driver is allowed to confirm the selected shifting mode more easily.

According to the exemplary embodiment of the present disclosure, the shift lever may be held not only at the desired shift position but also at the base position. In any of those cases, a currently selected operating range or shift position is indicated on the indicator while being highlighted. According to the exemplary embodiment of the present disclosure, therefore, the driver is allowed to confirm the selected operating range or shift position easily in any of those cases.

In order to operate the vehicle in a preferable condition in the second mode, an instruction to shift the shift position to a recommended position may be indicated on the indicator. According to the exemplary embodiment of the present disclosure, therefore, the driver is allowed to operate the vehicle in such a manner as to optimize energy efficiency in the second mode.

BRIEF DESCRIPTION OF THE DRAWINGS

Embodiments of the present disclosure will now be explained with reference to the accompanying drawings. Note that the embodiments shown below are merely examples of the present disclosure which should not limit a scope of the present disclosure.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

Figure 1:
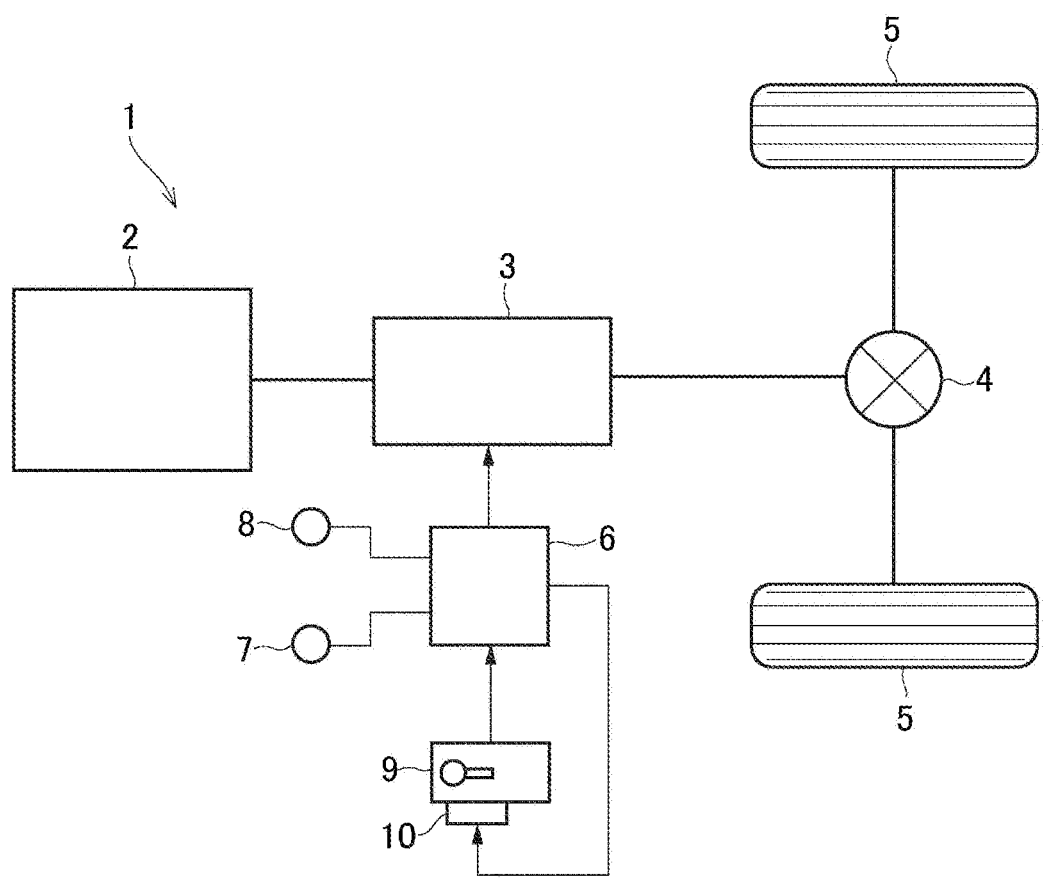
FIG. 1 is a block diagram schematically showing a structure of a vehicle to which the shifting device according to the exemplary embodiment of the present disclosure is applied.

Turning now to FIG. 1, there is shown a structure of a vehicle 1 to which the shifting device according to the exemplary embodiment of the present disclosure is applied. In the vehicle 1, a transmission 3 is connected to an output shaft of a prime mover 2 so that a driving force generated by the prime mover 2 is delivered to a pair of drive wheels 5 to propel the vehicle 1 through the transmission 3 and a final reduction unit 4. According to the exemplary embodiment of the present disclosure, the prime mover 2 includes an internal combustion engine, a motor, and a drive unit comprising the engine and the motor. The transmission 3 is configured to multiply the torque delivered from the prime mover 2, to interrupt torque transmission, and to output the torque while reverse a direction of the torque (i.e., a rotational direction). According to the exemplary embodiment of the present disclosure, the transmission 3 has a continuously variable speed change function to change a speed ratio continuously in accordance with a speed of the vehicle 1 and a required driving force represented by a position of an accelerator pedal. In addition, the transmission 3 may also serve as a virtual geared transmission to change a speed ratio stepwise. For example, a belt-driven continuously variable transmission, and a hybrid drive unit comprising a planetary gear unit as a power split mechanism connected to the engine and the motor may be adopted as the transmission 3.

A shifting mode of the transmission 3 may be selected form an automatic mode as a first shifting mode in which a speed change operation is caused automatically in accordance with a running condition of the vehicle 1, and a manual mode as a second shifting mode in which a speed ratio (i.e., a virtual gear stage) is shifted manually among predetermined ratios stepwise. The shifting mode of the transmission 3 is shifted electrically between the automatic mode and the manual mode, and the shifting operation of the transmission 3 is also executed electrically. Given that the belt-driven continuously variable transmission is adopted as the transmission 3, a speed change operation is executed in an optimally fuel efficient manner in accordance with a running condition of the vehicle 1 by changing an effective running diameter of a belt applied to pulleys. Given that the vehicle 1 is a hybrid vehicle, a speed of the engine is adjusted by the motor in line with an optimally fuel efficient curve by the motor.

In order to control the vehicle 1 in the above-explained manner, the vehicle 1 is provided with a controller 6 as an electronic control unit. The controller 6 comprises a microcomputer as its main constituent configured to perform calculation based on incident data transmitted from sensors and switch utilizing formulas and maps install in advance. The controller 6 transmits calculation results in the form of command signals to e.g., the transmission 3 to establish a desired speed ratio or to bring the transmission 3 into a neutral stage.

To this end, data relating to a running condition of the vehicle 1 such as a position of the accelerator pedal and a speed of the vehicle 1 are sent to the controller 6. In addition, the controller 6 receives a signal to shift the shifting mode of the transmission 3 between the automatic mode and the manual mode from a mode selector switch 7, a signal to halt the vehicle 1 in a parking range from a parking switch 8, and a signal to change a speed ratio of the transmission 3 from a shifting device 9. The controller 6 also transmits an indication signal to an indicator 10 so as to indicate a selected operating range or a selected stage on the indicator 10.

Figure 2:
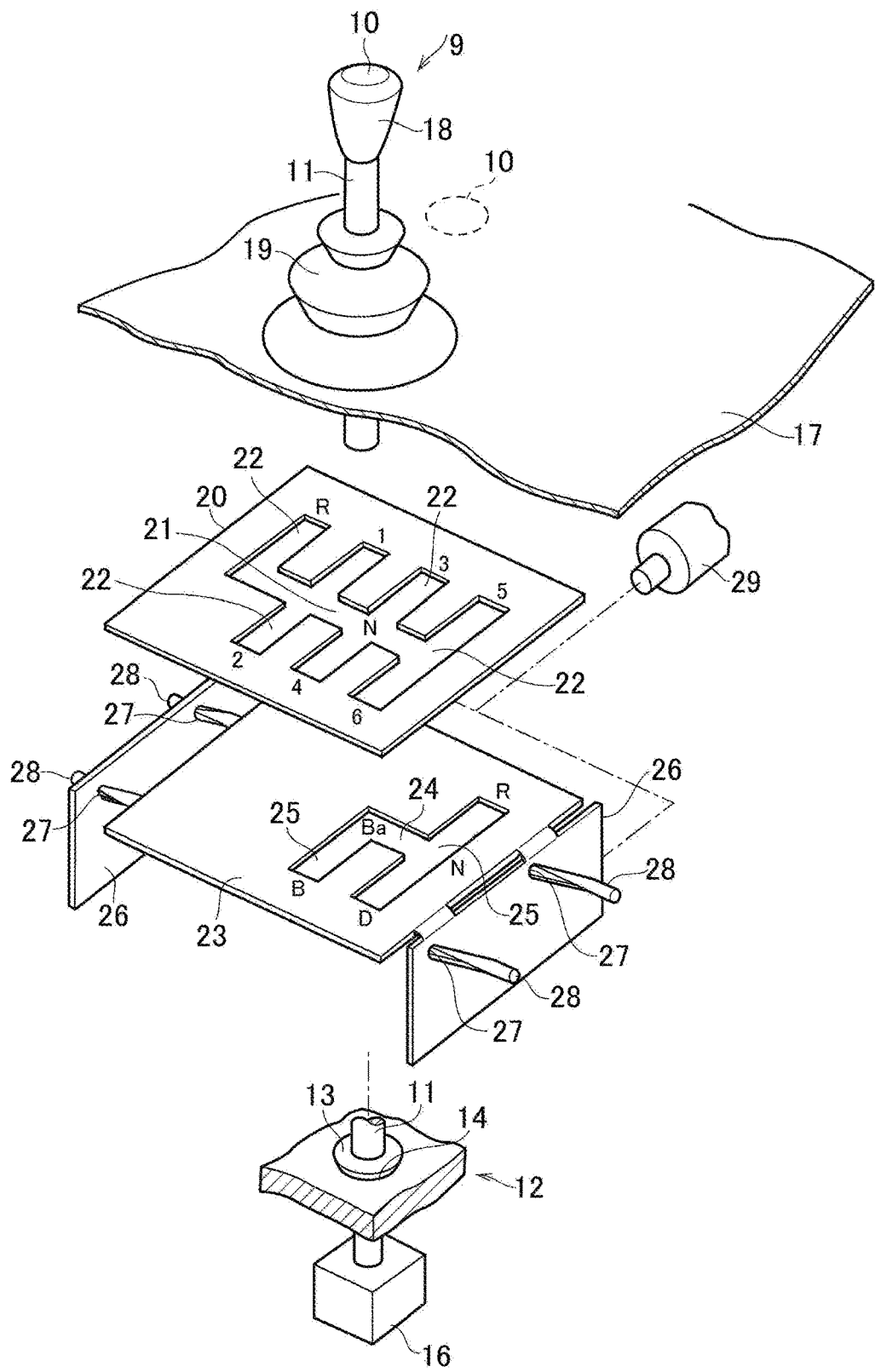
FIG. 2 is an exploded view showing components of the shifting device.
Figure 3:
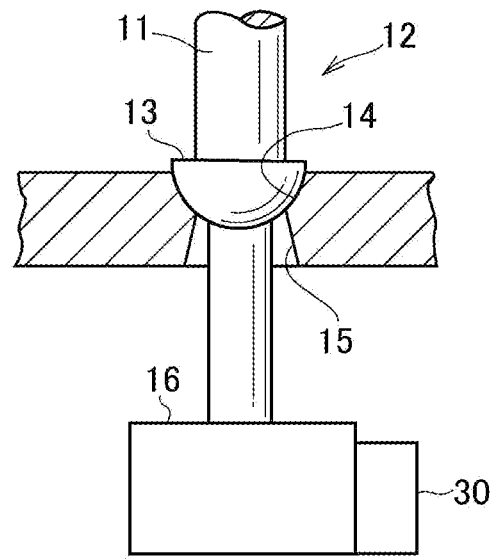
FIG. 3 is a cross-sectional view showing one example of a structure of a support section.

Turning to FIG. 2, there is shown a structure of the shifting device 9 according to the exemplary embodiment of the present disclosure. The shifting device 9 comprises a shift lever (also known as gear stick and gear lever) 11 that is manipulated by a driver. In the shifting device 9, specifically, the shift lever 11 is supported by a support section 12 in a pivotal manner so that the shift lever 11 is allowed to pivot not only in the longitudinal direction (tentatively referred to as X-axis) but also in a width direction (tentatively referred to as Y-axis) of the vehicle 1. That is, the X-axis and the Y-axis orthogonally crossed at the support section 12 so that the shift lever 11 is allowed to be tilted along the X-axis and the Y-axis. A structure of the support section 12 is shown in FIG. 3 in more detail. As illustrated in FIG. 3, a hemispherical support member 13 is mounted on a predetermined portion of the shift lever 11 in such a manner that a hemispherical surface of the support member 13 is slidably held in a hemispherical depression 14 formed on a predetermined stationary member. Thus, the shift lever 11 is vertically supported by the support member 13 and the depression 14 so that the shift lever may pivot 360 degrees about the support section 12.

A through hole 15 penetrates through a center of the depression 14, and a lower section of the shift lever 11 is inserted loosely into the through hole 15 to be joined to a balancer 16. The balancer 16 is adapted to maintain the shift lever 11 at a neutral position and to return the shift lever 11 to the neutral position. According to the exemplary embodiment of the present disclosure, in the balancer 16, springs are arranged around the lower section of the shift lever 11 along e.g., the X-axis and the Y-axis to keep the shift lever 11 at the neutral position.

An internal mechanism of the shifting device 9 is covered by a panel 17 as a part of an interior panel of the vehicle 1. An upper section of the shift lever 11 protrudes from the panel 17, and a shift knob 18 is attached to an upper end of the shift lever 11. An intermediate section of the shift lever 11 above the panel 17 and a hole of the panel 17 through which the shift lever 11 penetrates are covered by a rubber cover 19.

In order to operate the shift lever 11 in a same manner as a shift lever of a conventional manual transmission, a first guide plate 20 is arranged underneath the panel 17, and the shift lever 11 also penetrates through the first guide plate 20. In the first guide plate 20, a transverse selector slot 21 and a plurality of longitudinal shift slots 22 are formed to guide the shift lever 11, and a width of each of the selector slot 21 and the shift slots 22 is slightly wider than a diameter of the shift lever 11. That is, in the first guide plate 20, the selector slot 21 and the shift slots 22 are designed into a so called "H-type" shift pattern. Specifically, one end of the selector slot 21 is joined to one of the shift slots 22 extending in one of longitudinal directions to guide the shift lever 11 to a reverse position (R) located at a leading end of one of the shift slots 22.

The remaining three shift slots 22 extend perpendicular to the selector slot 21 and parallel to one another to guide the shift lever 11 to first to sixth forward positions located at each end of the shift slots 22. Specifically, the first forward position (1) is located next to the reverse position at one end of another one of the shift slots 22, and the second forward position (2) is located at the other end of another one of the shift slots 22 across the selector slot 21. Likewise, the third forward position (3) is located next to the first forward position at one end of still another one of the shift slots 22, and the fourth forward position (4) is located at the other end of still another one of the shift slots 22 across the selector slot 21. Further, the fifth forward position (5) is located next to the third forward position at one end of yet another one of the shift slots 22, and the sixth forward position (6) is located at the other end of yet another one of the shift slots 22 across the selector slot 21. Thus, the reverse position and the odd forward positions are located in order at one ends of the shift slots 22, and even forward stages are located in order at the other ends of the shift slots 22. In the first guide plate 20 thus designed, a neutral position (N) as a base position is located at an intersection between the selector slot 21 and the shift slot 22 extending between the third forward position and the fourth forward position. As explained, the first guide plate is oriented such that the selector slot 21 extends in the width direction of the vehicle 1, therefore, the driver is allowed to operate the shift lever 11 in a same manner as a shift lever of the conventional vehicle having a manual transmission.

In order to restrict an operating range of the shift lever 11 in the automatic mode, a second guide plate 23 as a restriction member is arranged underneath the first guide plate 20. To this end, in the second guide plate 23, a transverse selector slot 24 and two longitudinal shift slots 25 are formed to guide the shift lever 11.

In the second guide plate 23, the selector slot 24 and the shift slots 25 are formed to be congruent with a part of the selector slot 21 and the shift slots 22 of the first guide plate 20. In the second guide plate 23, specifically, the selector slot 24 is congruent with a portion of the selector slot 21 of the first guide plate 20 between the neutral position and the shift slot 22 extending between the fifth forward position and the sixth forward position. One end of the selector slot 24 is joined to one of the shift slots 25 which is congruent with the shift slot 22 of the first guide plate 20 extending between the fifth forward position and the sixth forward position. In the second guide plate 23, a reverse range position (R) is located at one end of one of the shift slots 25, a drive range position (D) is located at the other end of one of the shift slots 25, and a neutral range position (N) is located between the reverse range position and the drive range position.

The other end of the selector slot 24 is joined to the other one of the shift slots 25 which is congruent with a portion of the shift slot 22 of the first guide plate 20 between the neutral position and the fourth forward position, and a brake range position (B) is located at a leading end of the other one of the shift slots 25. In the second guide plate 23, a base position (Ba) is located at an orthogonal corner between the other end of the selector slot 24 and the other one of the shift slots 25.

Thus, in the second guide plate 23, the base position is located underneath the neutral position of the first guide plate 20, the shift slot 25 extending between the reverse range position and the drive range position is located underneath the shift slot 22 of the first guide plate 20 extending between the fifth forward position and the sixth forward position, and the brake range position is located underneath the fourth forward position of the first guide plate 20. In order to shift the shifting mode between the automatic mode and the manual mode, the second guide plate 23 may be reciprocated vertically between a lower limit level immediately above the support section 12 and an upper limit level immediately below the first guide plate 20.

For example, the second guide plate 23 may be reciprocated by a pantograph mechanism formed of four linkages. In this case, the second guide plate 23 is connected to the pantograph mechanism, and the second guide plate 23 is reciprocated by elongating and contracting the pantograph mechanism by a dedicated actuator or a rack and pinion mechanism. According to the exemplary embodiment of the present disclosure, the second guide plate 23 is reciprocated by a mechanism adapted to translate a horizontal motion into a vertical motion.

Specifically, as illustrated in FIG. 2, a pair of supporting plates 26 are arranged orthogonally on both sides of the second guide plate 23 extending parallel to the shift slots 25. In each of the supporting plates 26, a pair of oval guide holes 27 are formed, and each of the oval guide holes 27 is inclined with respect to the reciprocating direction of the second guide plate 23 at a same angle. That is, the oval guide holes 27 are inclined to be parallel to each other. Specifically, each of the oval guide holes 27 is inclined in such a manner that one end closer to a side where the drive range position is located is situated higher than the other end closer to a side where the reverse range position is located. As described, the supporting plates 26 are opposed to each other across the second guide plate 23, and a pin 28 is inserted into each of the oval guide holes 27 in a slidable manner.

That is, the second guide plate 23 is supported while being allowed to reciprocate only in the vertical direction. Whereas, the supporting plates 26 are supported while being allowed to be reciprocated horizontally only in the extending direction of the shift slots 25 by an actuator 29. Therefore, when the second guide plate 23 is moved horizontally by the actuator 29, the pins 28 slide along the oval guide holes 27 so that the second guide plate 23 is moved vertically at an angle of obliquely of the oval guide holes 27.

For example, in the manual mode, the second guide plate 23 is moved downwardly to the lower limit level so that the shift lever 11 is allowed to pivot more flexibly about the support section 12 within the selector slot 21 and the shift slots 22 of the first guide plate 20. To this end, in the manual mode, the second guide plate 23 is moved close to the support section 12 as much as possible. In addition, it is preferable to set a width of each of the selector slot 24 and the shift slots 25 slightly wider than the diameter of the shift lever 11.

In order to detect a shift position or a range position selected by operating the shift lever 11, the shifting device 9 is provided with a position detector 30. According to the exemplary embodiment of the present disclosure, the position detector 30 comprises: a selector sensor such as an MR-IC that detects a movement of the shift lever 11 in the transverse direction within the selector slots 21 and 24; and a shift sensor such as a Hall element in the longitudinal direction within the shift slots 22 and 25. Thus, the position detector 30 detects the selected shift position or range position based on a combination of a detected position of the shift lever 11 in the transverse direction and a detected position of the shift lever 11 in the longitudinal direction. That is, a selected stage is detected in the manual mode, and a selected operating range is detected in the automatic mode. For example, if the shift lever 11 is positioned at the sixth forward position of the first guide plate 20 in the automatic mode, the controller 6 determines that the reverse range is selected. Likewise, if the shift lever 11 is positioned at the fifth forward position of the first guide plate 20 in the automatic mode, the controller 6 determines that the drive range is selected.

Figure 4:
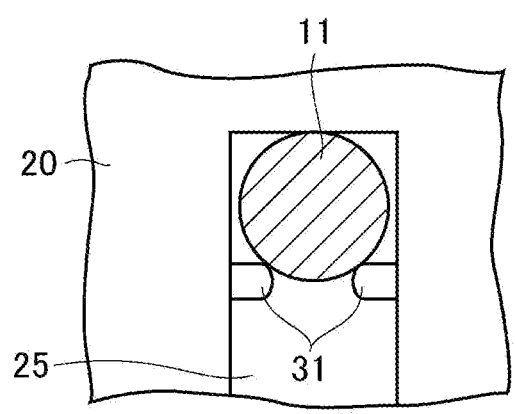
FIG. 4 is a schematic illustration showing one example of a detent mechanism.

In order to detect a movement of the shift lever 11 to a predetermined position and to hold the shift lever 11 at the predetermined position, the shifting device 9 is further provided with a detent mechanism. In a conventional shifting device of an automatic transmission, a shift lever is allowed to reciprocate in one direction, and a conventional detent mechanism employed in the conventional shifting device is adapted to hold the shift lever in one direction. Therefore, the shift lever 11 may be held not only in the transverse direction but also in the longitudinal direction by arranging such detent mechanisms in the shifting device 9 to hold the shift lever 11 in both transverse and longitudinal directions. For example, as illustrated in FIG. 4, a pair of elastic projections 31 are arranged in the vicinity of an end edge of e.g., the shift slot 25 to narrow the width of the shift slot 25. The pair of elastic projections 31 may also be arranged in the vicinity of each end edge of the shift slots 25 of the second guide plate 23 and the shift slots 22 of the first guide plate 20. In this case, when the shift lever passes though a clearance between the elastic projections 31, a reaction force established by the elastic projections 31 is applied temporarily to the shift lever 11. Therefore, an execution of shifting operation may be detected based on a change in an operating force to move the shift lever 11. In addition, after the completion of shifting operation, the shift lever 11 may be held at a desired position.

In the shifting device 9, since the first guide plate 20 and the second guide plate 23 are covered by the panel 17, the driver is not allowed to visibly confirm the selector slot 21 and the shift slots 22 of the first guide plate 20, and the selector slot 24 and the shift slots 25 of the second guide plate 23. Even if the panel 17 has a see-through design, it would be difficult for the driver to confirm range positions of the second guide plate 23 situated underneath the first guide plate 20. In the shifting device 9, therefore, a diagram of the shift pattern in the selected shifting mode is indicated by the indicator 10.

As described, the indicator 10 is controlled by the controller 6. Specifically, the controller determines a current position of the shift lever 11 based on the detection signal transmitted from the position detector 30, and indicates a selected operating range or a selected stage on the indicator 10. To this end, according to the exemplary embodiment of the present disclosure, a liquid crystal indicator is adopted as the indicator 10. Therefore, desired letters, diagrams, patterns etc. may be indicated arbitrarily in a desired color on the indicator 10, and brightness and luminescence of the indicator 10 may be adjusted arbitrarily. In addition, the indicator 10 may be turned on and off arbitrarily and hence the indicated letters and patterns may blink on and off. Specifically, the indicator 10 is arranged on a top surface of the knob 18 mounted on the upper end of the shift lever 11. Instead, the indicator 10 may also be arranged on e.g., the panel 17 in the vicinity of the shift lever 11.

Figure 5A:
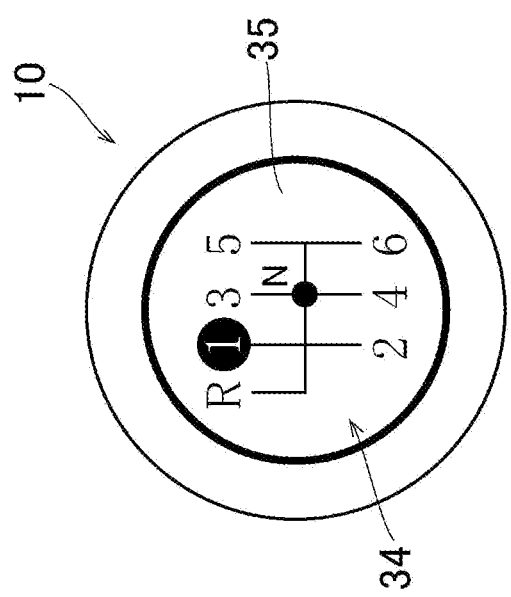
FIG. 5A is a top view of an indicator indicting a first pattern in an automatic mode, and FIG. 5B a top view of the indicator indicting a second pattern in a manual mode.
Figure 5B:
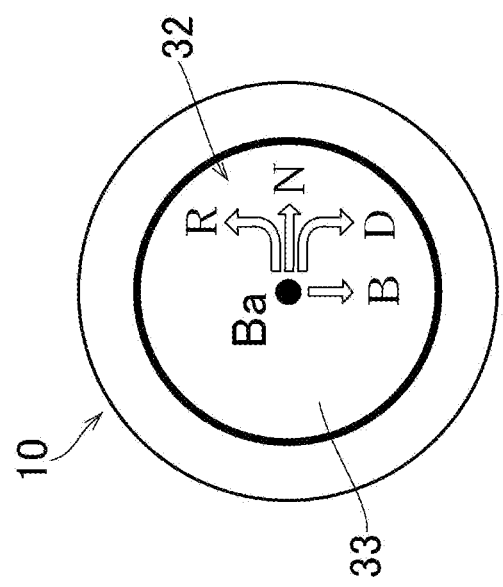

Turning to FIGS. 5A and 5B, there are shown the diagrams of the shift patterns indicated on the indicator 10. Specifically, FIG. 5A shows a first pattern indicated in the automatic mode. As depicted in FIG. 5A, the indicator 10 has a circular screen, and the base position (Ba) is indicated at the center of the screen. In the first pattern, arrows 32 extending from the base position (Ba) along the selector slot 24 and the shift slots 25 of the second guide plate 23 are indicated to indicate directions to the shift positions available to select in the automatic mode: the reverse range position (R); the neutral range position (N); the drive range position (D); and the brake range position (B). In addition, a concolor background or a patterned background may be indicated as a background 33.

Whereas, FIG. 5B shows a second pattern indicated in the manual mode. In the second pattern, a diagram 34 corresponding to a shift pattern governed by the selector slot 21 and the shift slots 22 of the first guide plate 20 is indicated on the screen. In the diagram 34, the shift positions available to select in the manual mode are indicated. The reverse position R and the 1st to 6th forward positions are indicated on each end of the diagram 34, and a dot representing the neutral position N is indicated between the third position 3 and the fourth position 4. In the second pattern, a concolor background or a patterned background may be also be indicated as a background 35. Graphic data about the first pattern and the second pattern may be stored in the controller 6.

As described, the shifting mode is switched between the automatic mode and the manual mode by operating the mode selector switch 7, and the selected shifting mode is indicated on the indicator 10. For example, in a case that the automatic mode is selected, the first pattern shown in FIG. 5A is indicated on the indicator 10, and the second guide plate 23 is lifted to the upper limit level so as to restrict the movable range of the shift lever 11 within the selector slot 24 and the shift slots 25 formed in the second guide plate 23. Whereas, in a case that the manual mode is selected, the second pattern shown in FIG. 5B is indicated on the indicator 10, and the second guide plate 23 is moved downwardly to the lower limit level so as to allow the shift lever 11 to pivot more flexibly about the support section 12 within the selector slot 21 and the shift slots 22 of the first guide plate 20. That is, the restriction on the pivotal movement of the shift lever 11 is cancelled. According to the exemplary embodiment of the present disclosure, therefore, the selected shifting mode as well as the operating range positions and the shift position may be confirmed visually. As an option, the selected shifting mode may be confirmed more easily by changing the color and the pattern of the backgrounds 33 and 35. In addition, the indicator 10 may have a mode indicating function to indicate e.g., a sign "A" or "Auto" in an available space of the first pattern in the case that the automatic mode is selected, and to indicate e.g., a sign "M" or "Manual" in an available space of the second pattern in the case that the manual mode is selected.

As also described, a position of the shift lever 11 may be detected based on the detection signals from the selector sensor and the shift sensor of the position detector 30, and the detected position of shift lever 11 may also be indicated on the indicator 10. According to the exemplary embodiment of the present disclosure, therefore, a pointer dot shown in FIGS. 5A and 5B may be moved in the indicator 10 to follow a movement of the shift lever 11 so as to highlight a current position of the shift lever 11. For example, in order to highlight the selected mode, the abovementioned signs indicating the selected mode may be indicated in boldface and in a desired font. Further, in order to highlight the current position of the shift lever 11, as shown in FIG. 5B, an open circle or dot may be indicated on the shift position. Otherwise, the remaining shift positions may be blurred or shaded to relatively highlight the current shift position. In addition, the current position of the shift lever 11 may also be highlighted by changing a size or font of the number or letter representing the current shift position.

In the manual mode, a recommended speed ratio (i.e., a recommended virtual gear stage) may be indicated on the indicator 10. In the manual mode, the virtual gear stage is selected at the driver's own discretion, but the virtual gear stage selected by the driver may be different from a recommended stage in which the vehicle 1 can be accelerated as intended in an optimally fuel efficient manner. In order to indicate the recommended stage on the indicator 10, a two-dimensional map for determining the recommended gear stage based on a position of the accelerator pedal and a speed of the vehicle 1 is stored in the controller 6. To this end, the controller 6 has an instruction function to indicate the recommended stage on the indicator 10 so as to instruct the driver to shift the virtual gear stage to the recommended stage, in a situation where a stage other than the recommended stage is currently selected. For example, an instruction message to shift the recommended stage may be indicated on the indicator 10. Otherwise, it is also possible to blink the number of the recommended stage indicated on the indicator 10. In addition, a message to instruct the driver to execute upshifting may be indicated on the indicator 10 when accelerating the vehicle 1, and a message to instruct the driver to execute downshifting may be indicated on the indicator when decelerating the vehicle 1. For these purposes, the color or pattern of the background 35 may be changed to instruct the driver to execute upshifting or downshifting. Otherwise, a blinking speed of the pointer dot may be changed to instruct the driver to execute upshifting or downshifting.

In order to select an operating mode of the vehicle 1 from a plurality of modes according to the driver's preference in the manual mode, a plurality of shift maps to cause an upshifting of the virtual gear stage at different timings may be stored in the controller 6. For example, in order to select the operating mode of the vehicle 1 from a sports mode as a second operating mode and an economy mode as a first operating mode, a shift map for operating the vehicle 1 in the sports mode and a shift map for operating the vehicle 1 in the economy mode may be stored in the controller 6. In this case, the shift map for operating the vehicle 1 in the sports mode is configured such that an upshift curve is set at a high speed side. In the sports mode, therefore, a timing to execute an upshifting is delayed with respect to an increase in a speed of the vehicle 1 so that the vehicle is propelled by a relatively larger driving force. Whereas, the shift map for operating the vehicle 1 in the economy mode is configured such that an upshift curve is set at a low speed side. In the economy mode, therefore, a timing to execute an upshifting is advanced so that the engine is operated at a low speed thereby improving a fuel efficiency or an energy efficiency.

Thus, the upshifting is caused at different timings in the sports mode and the economy mode. Therefore, it is preferable to instruct the driver to shift the virtual gear stage to the recommended stage while notifying the selected operating mode of the vehicle 1. To this end, for example a timing to blink the pointer dot may be changed in the sports mode and the economy mode.

Although the above exemplary embodiment of the present disclosure has been described, it will be understood by those skilled in the art that the present disclosure should not be limited to the described exemplary embodiments, and various changes and modifications can be made within the scope of the present disclosure. For example, a stopper member may also be arranged in the first guide plate 20 to restrict a movable range of the shift lever 11 within a desires pattern in the automatic mode, instead of the second guide plate 23.

What is claimed is:
1. A shifting device for a vehicle, comprising:
a shift lever that is moved to a desired shift position;
a plurality of shift slots that guide the shift lever to a plurality of shift positions; and
at least one selector slot that guides the shift lever from a base position to the shift slots,
wherein a shifting mode is selected from a first shifting mode and a second shifting mode to control a driving force to propel the vehicle in different manners,
the shifting device further comprising:
a restriction member that restricts a movement of the shift lever into a predetermined shift slot toward a predetermined shift position in the first shifting mode, and that cancels the restriction of a movement of the shift lever in the second shifting mode; and
an indicator that indicates a first pattern when the first shifting mode is selected, and that indicates a second pattern when the second shifting mode is selected,
wherein the first pattern indicates a diagram indicating directions from the base position to the shift positions available in the first shifting mode in which the movement of the shift lever is restricted by the restriction member, and
the second pattern indicates a diagram indicating the base position and the shift positions available in the second shifting mode in which the restriction of the movement of the shift lever is cancelled,
the shift lever is supported at its lower section while being allowed to pivot in a longitudinal direction and in a width direction of the vehicle,
the restriction member comprises:
a first guide plate;
a second guide plate that is arranged underneath the first guide plate while being allowed to reciprocate vertically; and
an actuator that reciprocates the second guide plate vertically with respect to the first guide plate,
wherein the shift lever penetrates through the first guide plate and the second guide plate,
the at least one selector slot includes:
a first selector slot that guides the shift lever in the width direction; and
a second selector slot that is formed to be congruent with a portion of the first selector slot in a vertical direction,
the plurality of shift slots include:
a plurality of first shift slots that is joined orthogonally to the first selector slot, and that guides the shift lever in the longitudinal direction; and
a plurality of second shift slots that is joined orthogonally to the second selector slot while being congruent with at least one of the first shift slots in the vertical direction, and that is less in number than the first shift slots, wherein the first selector slot and the first shift slots are formed in the first guide plate, the second selector slot and the second shift slots are formed in the second guide plate, the shift lever is guided to move within the first selector slot and the first shift slots when the second guide plate is at a lower level, and the movement of the shift lever is restricted to be within the second selector slot and the second shift slots when the second guide plate is at an upper level.

2. The shifting device for the vehicle as claimed in claim 1, wherein the indicator has a mode indicating function to indicate the shifting mode selected from the first shifting mode and the second shifting mode.

3. The shifting device for the vehicle as claimed in claim 2, wherein the mode indicating function includes:
- a function to indicate the selected shifting mode by letters;
- a function to change a color of a background of the indicated diagram depending on the selected shifting mode; and
- a function to change a pattern of the background depending on the selected shifting mode.

4. The shifting device for the vehicle as claimed in claim 1, wherein the indicator has a function to highlight the shift position selected by operating the shift lever being indicated in the diagram.

5. The shifting device for the vehicle as claimed in claim 4, wherein the indicator has a function to indicate the shift positions by letters, and the function to highlight the selected shift position includes a function to highlight the selected shift position by indicating the letters representing the selected position in different manners.

6. The shifting device for the vehicle as claimed in claim 1, wherein the actuator lifts the second guide plate toward the first guide plate when the first shifting mode is selected, and moves the second guide plate downwardly away from the first guide plate when the second shifting mode is selected.

7. The shifting device for the vehicle as claimed in claim 1, further comprising:
a reciprocating mechanism that reciprocates the second guide plate in the vertical direction while being reciprocated horizontally by the actuator,
wherein the reciprocating mechanism comprises:
- a third guide plate that is reciprocated horizontally by the actuator;
- a guide hole that is formed in the third guide plate to be inclined with respect to the vertical direction in the reciprocating direction of the third guide plate; and
- a pin that is formed integrally with the second guide hole to be inserted into the guide hole.

8. The shifting device for the vehicle as claimed in claim 1, further comprising:
a reciprocating mechanism that reciprocates the second guide plate in the vertical direction while being reciprocated horizontally by the actuator,
wherein the reciprocating mechanism includes a pantograph mechanism.

* * * * *